United States Patent
Chopra et al.

(10) Patent No.: US 10,246,599 B2
(45) Date of Patent: Apr. 2, 2019

(54) INK COMPOSITION AND METHOD OF DETERMINING A DEGREE OF CURING OF THE INK COMPOSITION

(71) Applicant: Xerox Corporation, Norwalk, CT (US)

(72) Inventors: Naveen Chopra, Oakville (CA); Gabriel Iftime, Cupertino, CA (US); Yiliang Wu, Mississauga (CA); Sandra J. Gardner, Oakville (CA)

(73) Assignee: XEROX CORPORATION, Norwalk, CT (US)

( * ) Notice: Subject to any disclaimer, the term of this patent is extended or adjusted under 35 U.S.C. 154(b) by 617 days.

(21) Appl. No.: 14/216,366

(22) Filed: Mar. 17, 2014

(65) Prior Publication Data
US 2015/0259556 A1    Sep. 17, 2015

(51) Int. Cl.
| H01B 1/02 | (2006.01) |
| C09D 11/52 | (2014.01) |
| H01B 1/22 | (2006.01) |
| C09D 11/037 | (2014.01) |
| C09D 11/106 | (2014.01) |

(52) U.S. Cl.
CPC ............ *C09D 11/52* (2013.01); *C09D 11/037* (2013.01); *C09D 11/106* (2013.01); *H01B 1/22* (2013.01)

(58) Field of Classification Search
CPC ....................................................... H01B 1/02
See application file for complete search history.

(56) References Cited

U.S. PATENT DOCUMENTS

| 8,709,288 B2* | 4/2014 | Rouse | C09D 11/52 101/129 |
| 2005/0062019 A1* | 3/2005 | Yukinobu | C09D 5/24 252/500 |
| 2005/0194577 A1* | 9/2005 | Kasuga | H01B 1/22 252/514 |
| 2008/0246007 A1* | 10/2008 | Gellrich | B05D 3/0254 252/500 |
| 2011/0031001 A1* | 2/2011 | Ishikawa | C23C 24/087 174/257 |
| 2013/0228207 A1* | 9/2013 | Wang | H01L 31/022425 136/244 |
| 2016/0251531 A1* | 9/2016 | Uchida | C09D 11/52 |

OTHER PUBLICATIONS

JP-2013-226484 priority application, full translation.*
JP-2013-266936 priority application, machine translation.*
(Continued)

*Primary Examiner* — William D Young
(74) *Attorney, Agent, or Firm* — MH2 Technology Law Group LLP

(57) ABSTRACT

A silver paste ink composition comprises a plurality of first particles comprising silver; a polymer binder; a carrier solvent; and a plurality of second particles comprising silver. The second particles are nanoparticles that are different than the first silver particles, the amount of second particles in the ink composition being sufficient to impart a first color to the uncured ink composition, the first color being different than the color of the same ink composition without the nanoparticles. The silver nanoparticles have a property of causing a change in the color of the ink composition when the ink composition is cured.

16 Claims, 4 Drawing Sheets

(56) References Cited

OTHER PUBLICATIONS

Pioloform Product Overview, Wacker Polymers, undated. (Year: 2018).*
Pilar Buera, et al, Biotechnol. Prog., 1992, 8, 144-148. (Year: 1992).*
Chopra et al., "Conductive Metal Inks with Polyvinylbutyral Binder", U.S. Appl. No. 13/925,506, filed Jun. 24, 2013.
Chopra et al., "Conductive Metal Inks with Polyvinylbutyral and Polyvinylpyrrolidone Binder", U.S. Appl. No. 13/925,352, filed Jun. 24, 2013.

* cited by examiner (70% Flake, 5% nanoparticles) CROSS-SECTION (75% Flake) CROSS-SECTION Ink Composition and Method of Determining a Degree of Curing of the Ink Composition

DETAILED DESCRIPTION

Field of the Disclosure

The present disclosure is directed to a silver paste ink composition comprising silver nanoparticles, and in particular, a method of determining a degree of curing using a color-change property of silver nanoparticle containing silver paste ink.

BACKGROUND

The current total market value for silver inks is estimated to be approximately $8 billion annually. A current main use for silver inks is for printing conductive lines and interconnects between electric parts in devices. Screen-printing is the method of choice for printing silver ink traces for applications such as photovoltaic cells, RFID antennas, and flexible electrical interconnects for high-value commodities such as hospital bed monitors/controls and military GPS units.

Silver paste inks consist of silver flake particles, a polymer binder, and a carrier solvent. A 'curing' step involves thermal treatment to drive off the carrier solvent and press the conductive flakes closer together in the polymer matrix for increased contact and electrical conductivity.

Oftentimes, it is difficult to monitor the uniformity of heating/curing. Without doing electrical testing, and actually touching the ink, there is currently no definitive way of knowing when the ink has been completely cured. Further, a film created with non-uniform heating profiles may lead to flake inhomogeneity and poor reliability. Thus, there is a need for a quick visual indicator to determine if a coated silver paste ink film has been completely cured.

SUMMARY

An embodiment of the present disclosure is directed to a silver paste ink composition. The composition comprises a plurality of first particles comprising silver, a polymer binder, a carrier solvent and a plurality of second particles comprising silver. The second particles are nanoparticles that are different than the first silver particles, the amount of second particles in the ink composition being sufficient to impart a first color to the uncured ink composition, the first color being different than the color of the same ink composition without the nanoparticles. The silver nanoparticles have a property of causing a change in the color of the ink composition when the ink composition is cured.

Another embodiment of the present disclosure is directed to a method of determining a degree of curing of a silver paste ink. The method comprises providing a silver paste ink composition. The silver paste ink composition comprises a plurality of first particles comprising silver, a polymer binder, a carrier solvent and a plurality of second particles comprising silver. The second particles are nanoparticles that are smaller than the first particles, the amount of second particles in the ink composition being sufficient to impart a first color to the uncured ink composition. . The method further comprises coating the silver paste ink composition onto a substrate. The silver paste ink composition is heated to a temperature and for a length of time sufficient to cure the composition. The ink is the first color prior to heating and a second color when curing is complete, the second color being different than the first color. The silver paste ink composition can be visually inspected to determine whether the color change indicates curing is complete.

Yet another embodiment of the present disclosure is directed to a cured silver ink composition. The composition comprises a plurality of first particles comprising silver; a polymer binder; and a plurality of aggregates of nanoparticles comprising silver. Both the aggregates and the nanoparticles are different than the first particles.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates embodiments of the present teachings and together with the description, serve to explain the principles of the present teachings.

Figure 1:
FIG. 1 shows images of uncured and cured ink coating films, according to embodiments of the present disclosure.

It should be noted that some details of the figure have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. In the drawings, like reference numerals have been used throughout to designate identical elements. In the following description, reference is made to the accompanying drawing that forms a part thereof, and in which is shown by way of illustration a specific exemplary embodiment in which the present teachings may be practiced. The following description is, therefore, merely exemplary.

Ink Composition

Described herein is a conductive ink composition comprised of a silver paste ink composition. The ink composition includes relatively large, high-aspect ratio particles comprising silver, a polymer binder, a carrier solvent; and nanoparticles comprising silver. The nanoparticles are smaller than the large particles and are capable of causing the silver paste ink to change colors when cured. Silver paste inks that turn color on thermal annealing are a unique means of visually indicating that an ink has been cured.

The large particles comprise silver and make up the majority of the conductive material of the silver paste ink composition. In an embodiment, the largest dimension of the large particles has an average length of from, for example, 0.5 to 15 microns, such as 1 to 10 microns or 2 to 10 microns, although sizes outside this range can also be employed. In an embodiment, the large particles are substantially pure silver, such as at least 95% by weight silver, or in other examples, at least 97% or 98% by weight silver.

In other embodiments, the large particles are a silver alloy, such as silver-copper or silver-nickel, and the like.

While the large particles may be of any shape, desirably the particles have a two dimensional-like shape, such as a flakes, rods, cones, plates, or a needle shape. In an embodiment, the particles have an average aspect ratio of at least about 3, such as at least about 5, where the aspect ratio is defined as a ratio of the largest dimension to the smallest dimension orthogonal to the largest dimension. In an embodiment, the large particles are flakes having an average flake size of from, for example, 1 to 10 microns, such as 2 to 10 microns.

The large particles may be present in the conductive paste in an amount of from, for example, about 50 to about 95 weight percent of the ink, such as about 60 to about 90 weight percent or about 70 to about 90 weight percent.

The ink also includes at least one polymer binder. Examples of suitable polymer binders include polyvinylbutyral (PVB) terpolymer thermoplastic binder, polyvinylpyrrolidone (PVP) and mixtures thereof. The binder of the conductive ink may be present in an amount of less than about 10 weight percent of the ink, such as for example from about 0.1 to about 10 weight percent, or from about 0.5 to about 5 weight percent, of the ink.

The PVB terpolymer binder is desirably a material that possesses a reasonably high viscosity to allow the ink to retain the pattern following printing, if necessary, with a Tg that allows the thermoplastic material to be melted or softened, and shear thinned, at reasonable temperatures (lower Tg being desirable for this aspect) yet also allows for the printed ink to be robust (requiring a higher Tg). The polyvinylbutyral terpolymer may have a weight average molecular weight (Mw) of about 10,000 to about 600,000 Da, such as from about 40,000 to about 300,000 Da or from about 40,000 to about 250,000 Da. The Tg of the PVB terpolymer binder is from, for example, about 60° C. to about 100° C., such as from about 60° C. to about 85° C. or from about 62° C. to about 78° C.

The polyvinylbutyral (PVB) terpolymer can have the following formula:

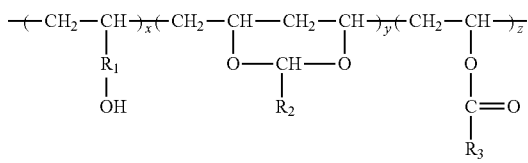

wherein $R_1$ is a chemical bond, such as a covalent chemical bond, or a divalent hydrocarbon linkage having from about 1 to about 20 carbons, from about 1 to about 15 carbon atoms, from about 4 to about 12 carbon atoms, from about 1 to about 10 carbon atoms, from about 1 to about 8 carbon atoms or from about 1 to about 4 carbon atoms; $R_2$ and $R_3$ are independently an alkyl group, such as a methyl, ethyl, propyl, butyl, pentyl, hexyl and heptyl groups, an aromatic group or a substituted aromatic group having from about 1 to about 20 carbon atoms, from about 1 to about 15 carbon atoms, from about 4 to about 12 carbon atoms, from about 1 to about 10 carbon atoms, from about 1 to about 8 carbon atoms or from about 1 to about 4 carbon atoms; x, y and z represent the proportion of the corresponding repeat units respectively expressed as a weight percent, wherein each repeat unit is randomly distributed along polymer chain, and the sum of x, y and z is about 100 weight percent; x is independently from about 3 weight percent to about 50 weight percent, from about 5 weight percent to about 40 weight percent, from about 5 weight percent to about 25 weight percent and from about 5 weight percent to about 15 weight percent; y is independently from about 50 weight percent to about 95 weight percent, from about 60 weight percent to about 95 weight percent, from about 75 weight percent to about 95 weight percent and from about 80 weight percent to about 85 weight percent; z is independently from about 0.1 weight percent to about 15 weight percent, from about 0.1 weight percent to about 10 weight percent, from about 0.1 weight percent to about 5 weight percent and from about 0.1 weight percent to about 3 weight percent.

The polyvinylbutyral terpolymer may be derived from a vinyl butyral, a vinyl alcohol and a vinyl acetate. A representative composition of the polyvinylbutyral terpolymer constitutes, on a weight basis, about 10 to about 25% hydroxyl groups, calculated as polyvinyl alcohol, about 0.1 to about 2.5% acetate groups calculated as polyvinyl acetate, with the balance being vinyl butyral groups. The Mw and Tg of the terpolymer may be adjusted through adjustment of the x, y and z values.

In an embodiment, the PVB terpolymer is employed where $R_1$ is a bond, x represents the amount of vinyl alcohol units in the terpolymer, $R_2$ is a 3 carbon alkyl group, y represents the amount of vinyl butyral units in the terpolymer, $R_3$ is a 1 carbon atom alkyl group and z represents the amount of vinyl acetate units in the copolymer. The PVB terpolymer is a random terpolymer.

The properties of the PVB terpolymer may be adjusted by adjusting the content of the different units making up the terpolymer. For example, by including a greater amount of vinyl acetate units and a lesser amount of vinyl butyral units (less y and more z) can yield a more hydrophobic polymer with higher heat distortion temperature, making it tougher and a better adhesive. Also, including lower amounts of vinyl alcohol (hydroxyl) units may broaden the solubility properties.

Examples of commercially available polyvinylbutyral terpolymers include, for example, polymers manufactured under the trade name MOWITAL (Kuraray America), S-LEC (Sekisui Chemical Company), BUTVAR (Solutia), and PLIOFORM (Wacker Chemical Company). The PVB terpolymer may be prepared as discussed in U.S. Patent Application Publication No. 2012/0043512, incorporated herein by reference in its entirety.

In further embodiments, the binder of the ink may include the PVB terpolymer discussed above, and also include polyvinylpyrrolidone (PVP) polymer. The PVP may have a weight average molecular weight (Mw) of from, for example, about 5,000 to about 80,000, such as about 40,000 to about 70,000. Commercial sources for PVP include Aldrich and ISP Corp. (K-30, with a Mw of about 60,000). The glass transition temperature of the PVP may be from, for example, 125° C. to 180° C., such as from about 150° C. to about 170° C. Examples of metal paste inks that employ both PVB and PVP are described, for example, in U.S. patent application Ser. Nos. 13/925,352 and 13/925,506, both filed Jun. 24, 2013, to Naveen Chopra, et al., and both of which are hereby incorporated by reference in their entirety.

The PVB terpolymer of the conductive ink may be present in an amount of less than about 8 weight percent of the ink, such as for example from about 0.1 to about 8 weight percent, or from about 0.5 to about 5 weight percent, of the ink. The PVP, when used with PVB, is added in an amount of from, for example, about 0.1 to about 3 weight percent of the ink composition, such as from about 0.1 to about 1.5 weight percent or from about 0.2 to about 0.8 weight percent. The weight ratio of PVP to PVB is, for example, from about 1:3 to about 1:30, for example from about 1:3 to about 1:25 or from about 1:5 to about 1:20. At a ratio including more PVP than a ratio of PVP to PVB of 1:3, the ink tends to not have a shear thinning profile suitable for application, which is a profile indicating a reduced viscosity upon shear thinning but rapid viscosity recovery following removal of shear thinning forces.

The inclusion of the PVP allows the ratio of overall polymer binder to conductive material to be reduced, and allows the viscosity profile of the ink to be tuned, offering a compromise between shear thinning behavior (better flow during application) and reduced resistivity. This enables the ink to be adjusted for application by way of printing methods such as screen printing, offset printing, flexographic/gravure printing and the like. The ink having both PVP and PVB terpolymer may be shear thinned for printing application, but then rapidly gains viscosity to form a robust printed pattern on the substrate.

The material and amounts of each of the PVB terpolymer and the PVP to use in the binder depends upon the printing procedure used to apply the ink to a substrate. For screen printing, where viscosity recovery is needed following application to the substrate, a weight ratio of PVP to PVB in the range of, for example, about 1:3 to about 1:30, achieves an ink with this property, along with an ink (including the conductive material therein) having a viscosity in the range of from, for example, about 10,000 to about 70,000 cps. For gravure printing, an ink with little to no PVB may be appropriate, because the viscosity recovery property is not required, and lower viscosity inks may be used, for example having a viscosity of 50 to 2,000 cps. For lithographic and flexographic printing, higher viscosities, for example of 50,000 cps or more, are required, and thus little to no PVP can be included in the ink.

In addition to the PVB terpolymer and/or PVP binders, it may be possible to include an additional thermoplastic binder. The at least one additional thermoplastic binder may include, for example, polyesters such as terephthalates, terpenes, styrene block copolymers such as styrene-butadiene-styrene copolymer, styrene-isoprene-styrene copolymer, styrene-ethylene/butylene-styrene copolymer, and styrene-ethylene/propylene copolymer, ethylene-vinyl acetate copolymers, ethylene-vinyl acetate-maleic anhydride terpolymers, ethylene butyl acrylate copolymer, ethylene-acrylic acid copolymer, polymethylmethacrylate, polyethylmethacrylate, and other poly(alkyl)methacrylates, polyolefins, polybutene, polyamides, and the like and mixtures thereof.

The binder may be made to have a different Mw and Tg in order to assist in imparting a different viscosity to the ink. Different liquid deposition techniques, for example such as screen printing, offset printing, gravure/flexographic printing and the like, require the use of inks having different viscosity requirements, as discussed above. The viscosity may be measured by a variety of methods, but herein is reported as measured with an ARES G2 rheometer (TA Instruments). In addition, use of more binder in the ink, and/or less solvent, may act to increase the viscosity of the ink.

The ink also includes at least one solvent. Any solvent capable of dissolving the polymer binder of the ink may be used. The solvent may be a single solvent or a mixture of solvents that dissolve the thermoplastic binder and that can evaporate following printing while being dried under mild drying conditions such as, for example, about 50° C. to about 250° C. The solvent may be an ester-based solvent, ketone-based solvent, glycol ether-based solvent, aliphatic solvent, aromatic solvent, alcohol-based solvent, ether-based solvent, water and the like, depending on the type of substrate on which the ink is to be applied, the printing method used to print the ink, and the like. Example solvents include, for example, water, n-heptane, n-hexane, cyclohexane, methyl cyclohexane and ethyl cyclohexane, toluene, xylene, methanol, ethanol, n-propyl alcohol, isopropyl alcohol, n-butyl alcohol, isobutyl alcohol, sec-butyl alcohol, t-butyl alcohol, cyclohexanol, 3-methoxybutanol, diacetone alcohol, butyl glycol, diols such as ethylene glycol, propylene glycol, diethylene glycol, triethylene glycol and hexylene glycol, ether alcohols such as butoxyethanol, propoxypropanol and butyldiglycol, ethers such as ethylene glycol di-C1-C6-alkyl ethers, propylene glycol di-C1-C6-alkyl ethers, diethylene glycol di-C1-C6-alkyl ethers, such as butyl carbitol (diethylene glycol monobutyl ether), and dipropylene glycol di-C1-C6-alkyl ethers, tetrahydrofuran, ketones such as acetone, methyl ethyl ketone, methyl propyl ketone, methyl isobutyl ketone, methyl amyl ketone, methyl isoamyl ketone, diethyl ketone, diisobutyl ketone, cyclohexanone, isophorone, 2,4-pentanedione and methoxy hexanone, esters or ether esters such as ethyl ethoxypropionate, methyl glycol acetate, ethyl glycol acetate, butyl glycol acetate, butyl diglycol acetate, methoxypropyl acetate, ethoxypropyl acetate, methoxybutyl acetate, methyl acetate, ethyl acetate, propyl acetate, butyl acetate, isobutyl acetate, pentyl acetate, hexyl acetate, heptyl acetate, ethylhexyl acetate, methyl propionate, ethyl propionate, propyl propionate, butyl propionate, pentyl propionate, butyl butyrate, diethyl malonate, dimethyl adipate, dimethyl glutarate, dimethyl succinate, ethylene glycol diacetate, propylene glycol diacetate, dibutyl phthalate and dibutyl sebacate, terpenes such as α- or β-terpineol, hydrocarbons like kerosene, or any combination thereof. The solvent may desirably be a glycol ether, such as butyl carbitol.

The solvent may be used in an amount of from about 5 to 50 weight percent of the ink, such as from about 5 to about 35 weight percent or from about 5 to about 25 weight percent. The type and amount of solvent or solvents can be adjusted to optimize printing with the ink for the particular printing method, apparatus speed, and the like.

The ink compositions of the present application include nanoparticles comprising silver (also referred to herein as "silver nanoparticles"). These nanoparticles are on average smaller than the large silver particles, which provide the majority of metal in the ink paste composition. One property of the silver nanoparticles is that when such particles have a sufficiently small size, they can cause the silver paste ink to have a color that is noticeably different from the color the silver paste ink otherwise has without the silver nanoparticles. For example, the color of the ink with the nanoparticles can be what appears to be a bronze color, rather than a silver-like color without the nanoparticles. Additionally, when the ink is cured, the color of the ink changes from the bronze color back to a silver-like color. This color change can provide a visual indicator of when the ink is fully cured.

The color change is due to the growth and/or aggregation of nanoparticles into micron-sized particles. It is believed that during the thermal annealing involved in the curing process, the nanoparticles may weld together to create the micron-sized particles. It is also possible that the nanoparticles may impart some benefits to the ink in the form of welded contacts between the flakes. Furthermore, the nanoparticle aggregates may have some other benefits, such as product authentication, since inspection of the cured film would reveal the micron-sized aggregates, which can act as a marker for the presence of nanoparticles in the uncured ink form. The resistivity of the final film is unaffected by the incorporation of the silver nanoparticles.

The silver nanoparticles can be any size that is sufficiently small so as to provide in the desired color change of the ink composition. In an embodiment, the silver nanoparticles have an average diameter ranging from about 3 nanometers to about 50 nanometers. For example, the silver nanoparticles can have an average diameter ranging from about 4 nanometers to about 20 nanometers, such as about 5 nanometers to about 10 nanometers. When the ink film is thermally annealed, the particles aggregate and fuse together to form larger particles. The aggregate particles can be any size that is sufficiently large so that the bronze color disappears, such as on the order of micron-sized particles (e.g., having diameter of about 500nm to about 1 or 2 microns or larger). The aggregate particles can be distinguished from the large particles discussed above at least because they are not two-dimensional type particles and/or do not have high aspect ratios. For example the average aspect ratio of the aggregate particles can generally be less than 2, such as, for example, an average aspect ratio of about 1.5 or about 1.

The silver nanoparticles comprise silver. In an embodiment, the silver nanoparticles can be substantially pure silver, such as at least 95% by weight silver, or in other examples, at least 97% or 98% by weight silver. In other embodiments, the large particles are a silver alloy. For example, the silver nanoparticles can comprise silver and at least one additional metal selected from the group consisting of Au, Cu, Ni, Co, Pd, Pt, Ti, V, Mn, Fe, Cr, Zr, Nb, Mo, W, Ru, Cd, Ta, Re, Os, Ir, Al, Ga, Ge, In, Sn, Sb, Pb, Bi, Si, As, Hg, Sm, Eu, Th, Mg, Ca, Sr and Ba. Other metals can also be employed in the silver alloys.

The nanoparticles can be coated with an organic molecule stabilizer to allow relatively uniform mixing and/or to reduce aggregation of the nanoparticles in the coating composition. Examples of stabilizers include acids and amines, such as octylamine, decylamine, dodecylamine, stearyl amine, octanoic acid, decanoic acid and stearic acid. Further examples of stabilizers are disclosed in U.S. patent application Ser. No. 7,494,608, issued on Feb. 24, 2009, to Yuning Li, et al., the discourse of which is hereby incorporated by reference in its entirety.

The composition can comprise any suitable concentration of silver nanoparticles that will impart the desired color to the ink composition. In an embodiment, the concentration of silver nanoparticles ranges from about 1% to about 75% by weight, relative to the total weight of the composition. For example, the concentration of silver nanoparticles can range from about 2% to about 50% by weight, such as about 3% to about 10, 20 or 30% by weight, relative to the total weight of the composition.

While in some embodiments discussed above the color of the uncured ink composition has been described as bronze and the color of the cured composition has been described as silver, the actual colors may vary depending on the amount and size of the nanoparticles employed, and may also potentially vary depending on the amount of silver and other ingredients employed in the composition. Further, the bronze and silver color characterizations are based on visual inspection of examples and the color perception of the inventors, and may or may not technically be considered bronze or silver in color, according to a specific color system.

In an embodiment, the color of the uncured compositions of the present disclosure has a lightness value that is less than that of the color of the cured compositions. For instance, the uncured ink composition without the nanoparticles can have a color having a first lightness, $L_1$. The nanoparticles impart a color having a second lightness, $L_2$, to the uncured ink composition. When the ink composition is cured it has a third lightness, $L_3$. $L_1$, $L_2$ and $L_3$ are lightness values as defined in CIELAB color space, which is a well known color system. In an embodiment, the lightness value of the uncured composition, $L_2$, is less than both $L_1$ and $L_3$. For example, $L_2$ can have a value that is at least 10 units less on the CIELAB lightness scale than $L_1$ or $L_3$. For example, $L_2$ can have a value that is at least 15 units or 20 units less than $L_1$ or $L_3$ on the CIELAB lightness scale. In an embodiment, $L_1$ and $L_3$ are a similar lightness or the same lightness values.

The conductive inks of the present disclosure may contain one or more optional additives such as, for example, a plasticizer, a lubricant, a dispersant, a leveling agent, a defoaming agent, an antistatic agent, an antioxidant and a chelating agent as necessary or desired.

The inks of the present application desirably exhibit a rheology in which the viscosity is about 20 Pa·s or more, such as 20 to 75 Pa·s or more, at a shear of $1\ s^{-1}$, and in which the viscosity can be reduced when the shear is $50\ s^{-1}$. This enables the ink to be suitable for application by way of printing methods such as screen printing and the like. The ink may be shear thinned for printing application, but thereafter rapidly gains viscosity upon removal of shearing to form a robust printed pattern on the substrate. For other printing applications not requiring viscosity recovery, such as gravure printing, this rheology profile would not be required.

Methods of Making and Printing an Ink Composition

The conductive inks may be made by any suitable method. One example method is to first dissolve the binder(s) in the solvent(s) of the ink, which may be done with the accompanying use of heat and/or stirring. The silver particles may then be added, desirably at a gradual rate of addition to avoid lumping. The silver nanoparticles can be added prior to, simultaneous with or following the addition of the silver particles. Heat and/or stirring may again be applied during the addition of the silver particles and/or silver nanoparticles.

The silver paste inks are used to form conductive features on a substrate by printing. The printing may be carried out by depositing the ink on a substrate using any suitable printing technique. The printing of the ink on the substrate can occur either on a substrate or on a substrate already containing layered material, for example, a semiconductor layer and/or an insulating layer.

Printing herein refers to, for example, deposition of the ink composition on the substrate. Printing can also include any coating technique capable of forming the ink into a desired pattern on the substrate. Examples of suitable techniques include, for example, spin coating, blade coating, rod coating, dip coating, lithography or offset printing, gravure, flexography, screen printing, stencil printing, stamping (such as microcontact printing), and the like.

The substrate upon which the conductive ink is deposited may be any suitable substrate, including, for example, silicon, glass plate, plastic film, sheet, fabric, or paper. For structurally flexible devices, plastic substrates, such as for example polyester, polycarbonate, polyimide sheets and the like may be used.

Following printing, the patterned deposited ink is subjected to a curing step. The curing step is a step in which substantially all of the solvent of the ink is removed and the ink is firmly adhered to the substrate. Curing includes heating the silver paste ink composition to a temperature and for a length of time sufficient to cure the composition.

As described above, the ink is a first color prior to heating and a second color when curing is complete. The second color is different than the first color. For instance, the first color can be bronze and the second color can be silver. In an embodiment, the process of curing can include visually inspecting the silver paste ink composition to determine whether the color change indicates curing is complete.

The curing step is performed by subjecting the deposited patterned ink to a temperature of, for example, about 80° C. to about 200° C., such as about 100° C. to about 160° C., or about 120° C. to about 140° C. Generally speaking, the curing times may range from 1 minute to 4 hours, such as 30 minutes to 2 hours, or 1 hour to 2 hours. The length of time for curing may vary, as understood by practitioners in the art, based upon the amount of solvent in the ink, the viscosity of the ink, the method used to form the printed pattern, the temperature used for curing, and the like. For screen printing, the curing may take from, for example, about 5 to about 120 minutes. For offset printing, the curing may take from, for example, 20 seconds to 2 minutes. For gravure and flexographic printing, the curing may take from, for example, 20 seconds to 2 minutes. Longer or shorter times may be used, as necessary.

The heating for curing can be performed in air, in an inert atmosphere, for example, under nitrogen or argon, or in a reducing atmosphere, for example, under nitrogen containing from 1 to about 20 percent by volume hydrogen. The heating can also be performed under normal atmospheric pressure or at a reduced pressure of, for example, from about 1000 mbars to about 0.01 mbars.

As used herein, "heating" encompasses any technique(s) that can impart sufficient energy to the patterned ink to cure the ink. Examples of heating techniques may include thermal heating, infra-red ("IR") radiation, a laser beam, flash light, microwave radiation, or UV radiation, or a combination thereof.

When the curing step is completed, the solvent is essentially evaporated. By removal of substantially all of the solvent is meant that 90% or more of the solvent is removed from the system. The ink film that remains is essentially only conductive material and binder. Curing herein does not require a crosslinking or other transformation of the binder, although if a crosslinkable binder is used in the ink it may be crosslinked during the curing step if desired.

Following curing, the patterned ink may be subjected to an optional fusing step in which heat and pressure are applied to the ink pattern. Any suitable fusing process can be employed. Suitable fusing processes are well known in the art.

While the curing and fusing steps are separately described, these steps may be performed simultaneously, for example both being done in conjunction with the fusing step. In other words, the heat applied during the fusing step may also act to cure the printed ink, thereby resulting in process efficiencies. In such embodiments, the curing apparatus is within the fusing apparatus such that the apparatus should be considered one and the same.

The resulting elements from the silver paste ink may be used as electrodes, conductive pads, interconnect, conductive lines, conductive tracks, and the like in electronic devices such as thin film transistors, organic light emitting diodes, RFID (radio frequency identification) tags, photovoltaic, displays, printed antenna and other electronic devices which require conductive elements or components.

The embodiments disclosed herein will now be described in detail with respect to specific exemplary embodiments thereof, it being understood that these examples are intended to be illustrative only and the embodiments disclosed herein are not intended to be limited to the materials, conditions, or process parameters recited herein. All percentages and parts are by weight unless otherwise indicated.

EXAMPLES

Example 1

Silver Paste Ink Composition

A silver paste ink composition was made having the ingredients shown in Table 1, below. The procedure followed for making the ink composition is described in the following paragraph.

TABLE 1

| Component | wt % | m (g) |
|---|---|---|
| Silver flakes (2-5 μm) | 70.00 | 46.69 |
| Silver nanoparticles (5-10 nm) | 5.00 | 3.34 |
| Poly(vinyl butyral) | 3.75 | 2.50 |
| Di(ethylene glycol) monobutyl ether (Butyl carbitol) | 21.25 | 14.17 |
| TOTAL | 100.00 | 66.70 |

To a 250mL beaker equipped with a stainless steel anchor mixing blade was added 25 g of 15wt % solution of PVB in butyl carbitol (BUTVAR B-98, available from Monsanto). The mixture was stirred at 500RPM at room temperature. Next, 46.69g of silver flakes (MR-10F, available from INFRAMAT) were added gradually to the mixture in stages to avoid lumping, followed by 3.34 g of Ag nanoparticles in the form of a wetcake. The mixture turned from silver to bronze after the nanoparticles were added. After 30 minutes of mixing, the ink paste was passed 3 times through a 3-roll-mill (ERWEKA model# AR 400).The finished paste ink was isolated and transferred to an amber glass jar.

Example 2

Ink Coating

Inks of Example 1 were coated at room temperature using a drawdown square at 1 and 2 mil wet thicknesses using a GARDCO automated drawdown apparatus onto 2mil MYLAR films. The films were thermally cured at 120° C. for 30minutes in a convection oven. FIG. 1 shows images of the uncured and cured ink coating films.

Figure 2A:
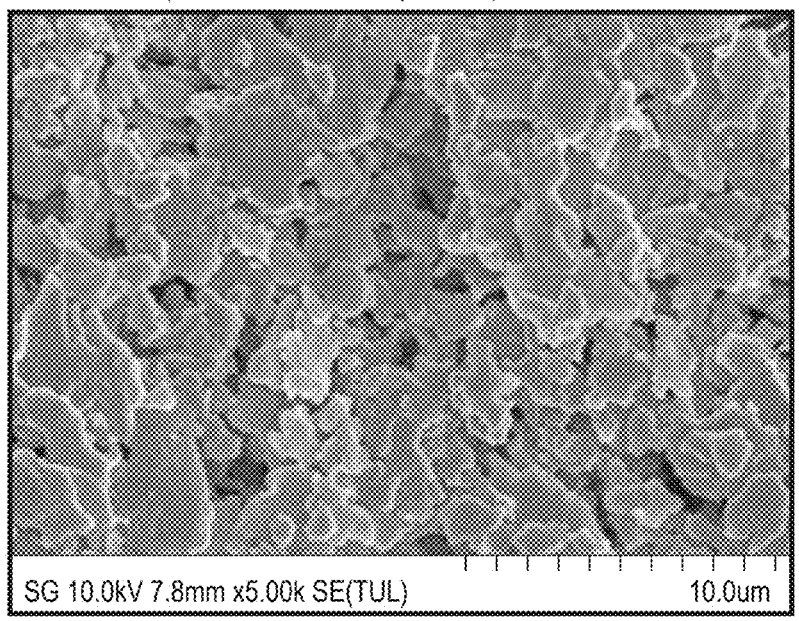
FIGS. 2A and 2B are top views of the cured ink film of Example 2 and a control paste ink without nanoparticles, respectively.
Figure 2B:
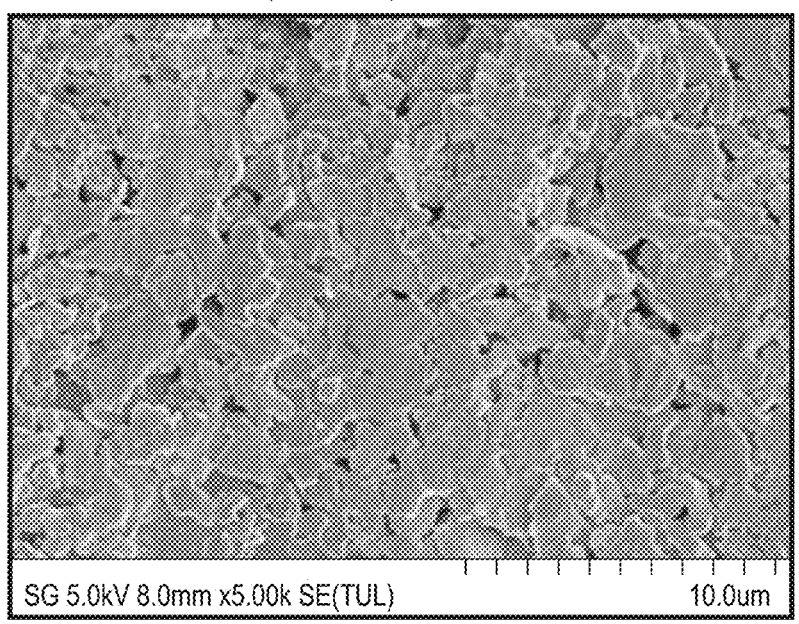
Figure 3A:
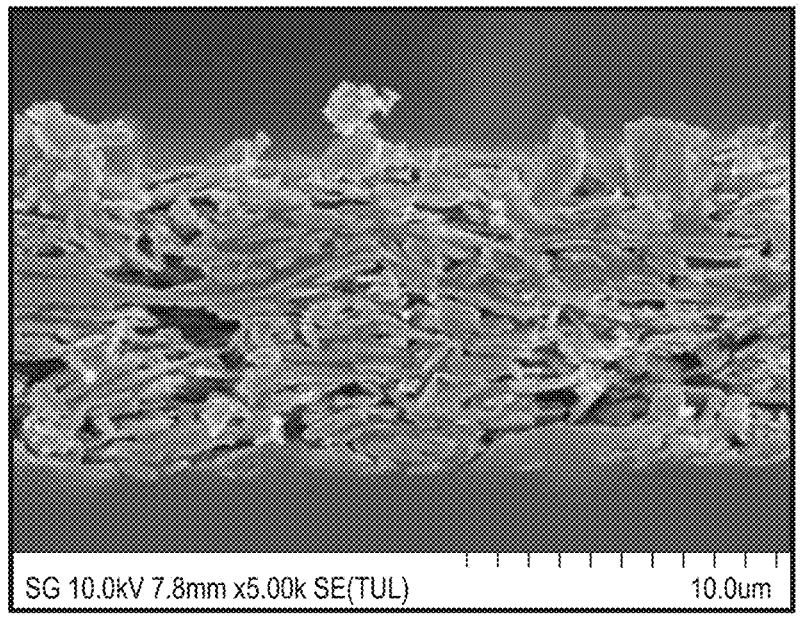
FIGS. 3A and 3B are cross-sectional views of the ink of Example 2 and the control ink, respectively, according to an example of the present disclosure.
Figure 3B:
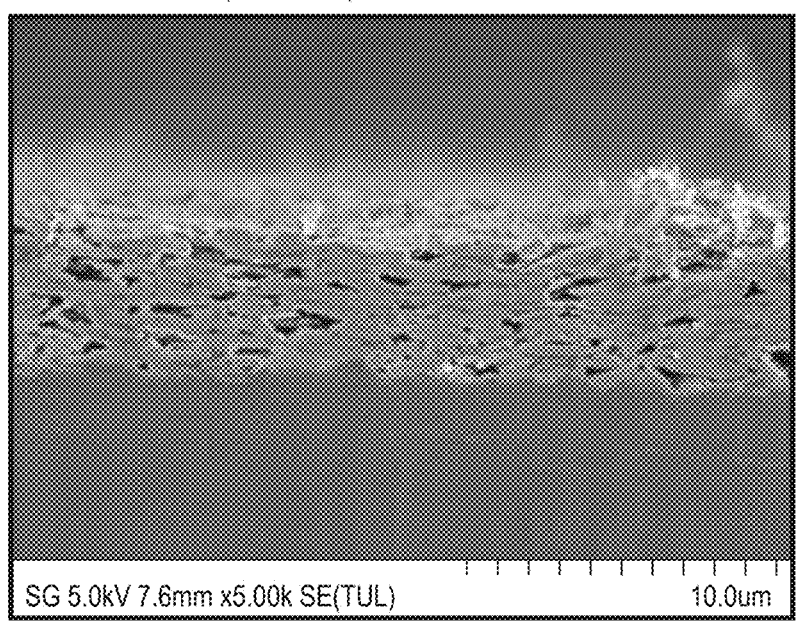
Figure 4:
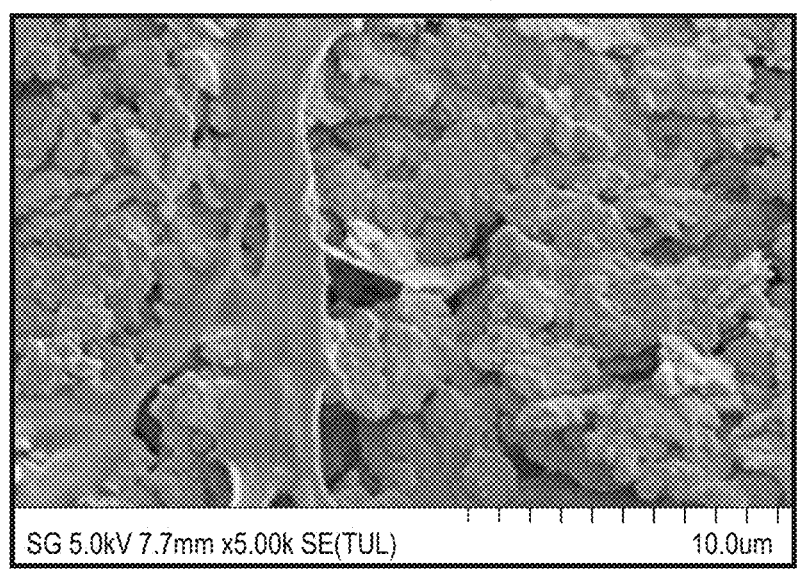
FIG. 4 shows a cured ink film, according to an embodiment of the present disclosure.

Samples were cut and mounted in an SEM. FIGS. 2A and 2B are top views of the cured ink film of Example 2 and a control paste ink without nanoparticles, respectively. FIGS. 3A and 3B are cross-sectional views of the Example 2 and the control ink, respectively. The inks appear virtually the same, indicative that the nanoparticles have not caused any disruption to the flake morphology. It may be possible that the nanoparticles could, in theory, weld together and connect the flakes for an enhanced conductivity. It may also be possible to use the presence of annealed nanoparticles (as micron-sized aggregates) as a 'marker' to show that nanoparticles were used in the ink formulation. This could prove useful for product authentication and tracking applications. At very high loadings of nanoparticle (25%), this is clearly visible as a 'textured' surface. See FIG. 4.

Example 3

Resistivity Measurement

A 2-point probe measurement was performed as follows: Lines of about 200 mm length and about 2 mm width were cut into the film to test. Resistance was measured with a multimeter. Thickness of the line coating was measured in several places on the line and an average thickness was calculated. The sheet resistance is given by the following formula:

$$\text{Sheet resistance} \left[\frac{\frac{\Omega}{\text{square}}}{\text{mil}}\right] = \frac{\text{Resistance}\,[\Omega] * \text{Thickness}\,[\text{mils}]}{\text{squares number [dimensionless]}}$$

$$\text{where: squares number} = \frac{\text{Length [mm]}}{\text{Width [mm]}}$$

The reported sheet resistance value is specific to the ink. The lower the sheet resistance value the better the conductivity. The goal is to minimize sheet resistance. The sheet resistivities were recorded as mOhms/sq/mil.

Table 2 below shows the comparison of a silver paste ink with silver nanoparticles prepared according to the procedure of Example 2 versus a comparative example of silver paste ink that does not contain silver nanoparticles. The resistivity values are in the comparable range of each other. It is anticipated that the resistivity of the inks of the present disclosure can be further reduced by optimizing the annealing process such as at a higher curing temperature.

TABLE 2

Comparison of Ink of Example 2 and Comparative Ink

| Sample # | L (mm) | W (mm) | Thickness (microns) | Thickness (mils) | Resistance (Ω) | Square | Sheet Resistance (mΩ/square/mil)- Multimeter method | Avg Sheet Resistance (mΩ/square/mil) |
|---|---|---|---|---|---|---|---|---|
| Ink of Example 2/1 mil | 200 | 2.0 | 6.9 | 0.28 | 5.7 | 100 | 15.7 | 15.3 |
|  | 100 | 2.0 | 6.4 | 0.26 | 2.9 | 50 | 14.8 |  |
| Xerox Ag Paste Ink/ 1 mil/ 10:15 (comparative example) | 100 | 2.0 | 6.1 | 0.24 | 2.8 | 50 | 13.7 | 12.4 |
|  | 100 | 2.0 | 6.2 | 0.25 | 2.4 | 50 | 11.9 |  |
|  | 100 | 2.0 | 5.8 | 0.23 | 2.5 | 50 | 11.6 |  |

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. An uncured silver paste ink composition, comprising:
   a plurality of first particles comprising silver, the first particles being flakes and having a largest dimension with an average length ranging from about 2 microns to about 10 microns, the first particles being present in the silver paste ink composition in an amount ranging from 70% by weight to about 95% by weight, based on the total weight of the silver paste ink composition;
   a polymer binder comprising a thermoplastic material selected from the group consisting of a polyvinylbutyral terpolymer of a formula I and a mixture of the polyvinylbutyral terpolymer of formula I and polyvinylpyrrolidone,

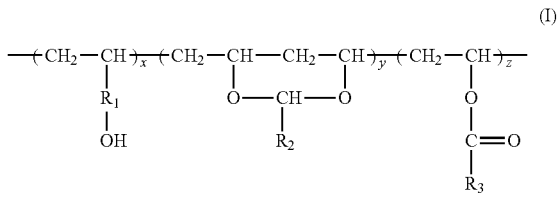

where $R_1$ is a chemical bond or a divalent hydrocarbon linkage having from about 1 to about 20 carbons; $R_2$ and $R_3$ are independently an alkyl group, an aromatic group or a substituted aromatic group having from about 1 to about 20 carbon atoms; x, y and z represent the proportion of the corresponding repeat units respectively expressed as a weight percent, and the sum of x, y and z is about 100 weight percent; x is independently from about 3 weight percent to about 50 weight percent; y is independently from about 50 weight percent to about 95 weight percent; and z is independently from about 0.1 weight percent to about 15 weight percent, the polymer binder being in an amount ranging from 0.5 to 5 weight percent, based on the total weight of the silver paste ink composition;

a carrier solvent; and a plurality of second particles comprising silver and having an average diameter ranging from about 3 nanometers to about 10 nanometers, the second particles being nanoparticles that are different than the first silver particles, the second particles in the ink composition being in an amount effective to impart a first color to the uncured silver paste ink composition, the first color being different than the color of the same ink composition without the nanoparticles, wherein the silver nanoparticles have a property of causing a change in the color of the ink composition when the ink composition is cured, the amount of second particles ranging from 3% by weight to about 20% by weight, relative to the total weight of the silver paste ink composition, wherein the plurality of second particles comprising silver are coated with an organic molecule stabilizer selected from the group consisting of octylamine, decylamine, dodecylamine, stearyl amine, octanoic acid, decanoic acid and stearic acid.

2. The composition of claim 1, wherein the uncured silver paste ink composition without the nanoparticles would be a color having a first lightness, $L_1$; the nanoparticles impart a color having a second lightness, $L_2$, to the uncured silver paste ink composition; and wherein if the ink composition were cured it would have a third lightness, $L_3$, where $L_1$, $L_2$ and $L_3$ are lightness values as defined in CIELAB color space, and further wherein $L_2$ is less than both $L_1$ and $L_3$.

3. The composition of claim 1, wherein the concentration of second particles ranges from about 3% to about 10% by weight, relative to the total weight of the composition.

4. The composition of claim 1, wherein the concentration of carrier solvent ranges from about 5% to about 25% by weight, relative to the total weight of the composition.

5. The composition of claim 1, wherein $R_1$ is a bond, $R_2$ is a 3 carbon alkyl group, and $R_3$ is a 1 carbon atom alkyl group.

6. The composition of claim 5, wherein the solvent is Di(ethylene glycol) monobutyl ether.

7. The composition of claim 5, wherein the solvent is a glycol ether.

8. The composition of claim 1, wherein the polyvinylbutyral terpolymer has a weight average molecular weight of about 10,000 to about 600,000 Daltons.

9. The composition of claim 1, wherein the polyvinylbutyral terpolymer has a glass transition temperature ("$T_g$") of from about 60° C. to about 100° C.

10. The composition of claim 1, wherein the polymer binder is the mixture of polyvinylbutyral terpolymer of formula I and polyvinylpyrrolidone.

11. The composition of claim 10, wherein the polyvinylpyrrolidone has a weight average molecular weight of about 5,000 to about 80,000 Daltons.

12. The composition of claim 10, wherein the polyvinylpyrrolidone has a glass transition temperature ("$T_g$") of from 125° C. to 180° C.

13. A method of determining a degree of curing of a silver paste ink, the method comprising:

providing the uncured silver paste ink composition of claim 1;

coating the silver paste ink composition onto a substrate;

heating the silver paste ink composition to a temperature and for a length of time sufficient to cure the composition, wherein the ink has a first color prior to heating and has a second color when curing is complete, the second color being different than the first color; and visually inspecting the silver paste ink composition to determine whether the color change indicates that curing is complete.

14. The method of claim 13, wherein the coating comprises screen printing the silver paste ink.

15. The method of claim 13, wherein the first color has a lightness, $L_2$, and the second color has a lightness, $L_3$, wherein $L_2$ and $L_3$ are lightness values as defined in CIELAB color space, and further wherein $L_2$ is less than $L_3$.

16. The method of claim 13, wherein the curing temperature ranges from about 80° to about 200° C.

* * * * *